(12) United States Patent
Murphy et al.

(10) Patent No.: US 7,730,539 B2
(45) Date of Patent: Jun. 1, 2010

(54) AUTHENTICATING THIRD PARTY PRODUCTS VIA A SECURE EXTENSIBILITY MODEL

(75) Inventors: Elissa E. S. Murphy, Seattle, WA (US); Mark T. K. Looi, Issaquah, WA (US); Laurent Vernhes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1074 days.

(21) Appl. No.: 11/256,671

(22) Filed: Oct. 21, 2005

(65) Prior Publication Data
US 2007/0094260 A1   Apr. 26, 2007

(51) Int. Cl.
*G06F 12/14* (2006.01)
*G06F 21/00* (2006.01)

(52) U.S. Cl. ............................. 726/25; 709/226; 705/57
(58) Field of Classification Search ...................... None
See application file for complete search history.

(56) References Cited

U.S. PATENT DOCUMENTS

2003/0078891 A1*  4/2003  Capitant ..................... 705/57
2006/0031510 A1*  2/2006  Beck et al. ................. 709/226

* cited by examiner

*Primary Examiner*—Brandon S Hoffman
(74) *Attorney, Agent, or Firm*—Lee & Hayes, PLLC

(57) ABSTRACT

Secure extensibility access to application program interfaces (APIs) is described. Techniques are described in which trust indicia are used determine relative trustworthiness of an extensibility module attempting to access of APIs of an application module. Access to APIs of the application module is managed based upon trustworthiness of the extensibility module.

18 Claims, 6 Drawing Sheets

600

602
Examine a Policy that describes Permissible Access to an Application Module based upon Trustworthiness of an Extensibility Module attempting Access

604
Manage Access to APIs of Application Module based upon an Examined Policy

AUTHENTICATING THIRD PARTY PRODUCTS VIA A SECURE EXTENSIBILITY MODEL

BACKGROUND

Computer software applications often provide mechanisms for extensibility, such that third party developers may create third-party applications adding functionality to host software. Extensibility is typically provided by permitting access to published or unpublished application program interfaces (APIs) within the host software.

Traditionally, APIs were made openly available to anyone desiring to access the APIs to encourage development and increased functionality of the underlying software. Accordingly, APIs may be freely used to provide enhanced functionality and to deliver additional functionality to end-users. However, APIs may also be targeted by malicious parties, which may exploit the APIs for malicious purposes to attack the underlying software and/or attack other software. When users are utilizing a trusted application, for instance, it is often difficult for the users to know when to trust third-party applications that plug into the trusted application and extend functionality. Thus, users may unknowingly install an untrustworthy, rouge, or malicious extensibility application that may cause harm.

SUMMARY

Authenticating third party products via a secure extensibility access model is described which may be utilized to establish trust and prevent malicious extensions. In an implementation, trustworthiness is established for an extensibility module that attempts to access application program interfaces (APIs) of a host application. The secure extensibility access model, for instance, may reference a plurality of trust indicia that are utilized to determine whether the application is trusted (e.g., from a trustworthy source). An extensibility module may be permitted or denied access to APIs based on the established trustworthiness. The extensibility module may also be given differential access to subsets of APIs. (e.g., permitted to access certain APIs and denied access to other APIs). Further, the extensibility module may be prevented from executing entirely or quarantined if trustworthiness is below a threshold level or is unknown.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a flow chart depicting a procedure in an exemplary implementation in which policies are used to manage access to APIs.

The same reference numbers are utilized in instances in the discussion to reference like structures and components.

DETAILED DESCRIPTION

Overview

Figure 1:
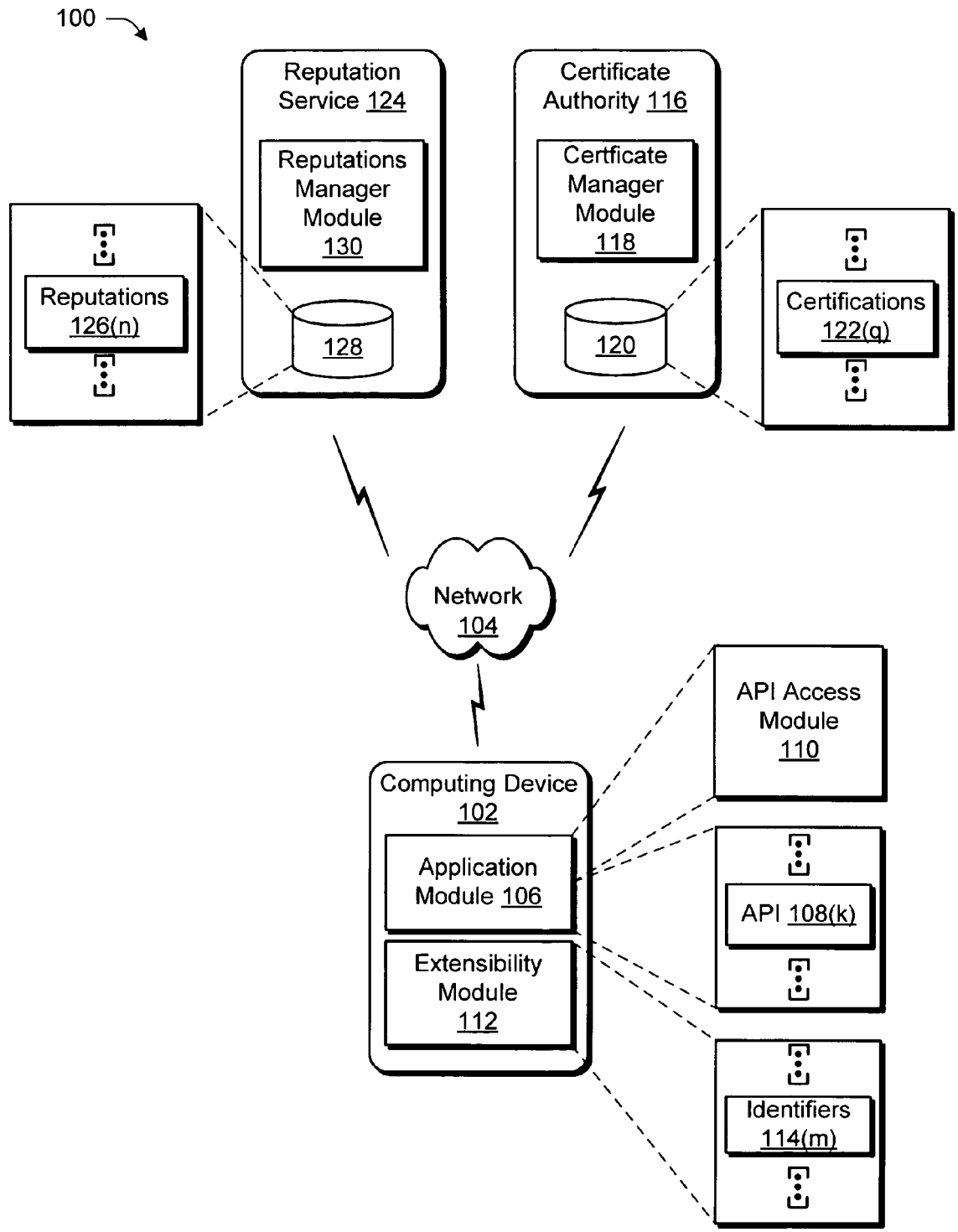
FIG. 1 is an illustration of an environment operable for an extensibility module seeking access to application programming interfaces (APIs) of an application module.

Secure extensibility module access to application program interfaces (APIs) of an application module is described. APIs in many applications today typically are available to anyone seeking to utilize the APIs to add functionality to the host application. For example, a third party developer may develop an extensibility module (e.g., add-in, extension, plug-in and so forth) for the host application that extends (e.g., provides added or different functionality) the application. However, users of the application may not be able to distinguish a good extensibility module from a malicious extensibility module. Thus, a rouge or malicious extensibility module that causes harm may be mistakenly installed. Secure extensibility access techniques are described which may be used to manage access given to an extensibility module seeking to utilize APIs of a host application to provide extended functionality to the application module.

In one or more implementations, establishing trustworthiness of an extensibility module seeking to access the APIs of an application module is described. Trustworthiness may be established on the basis of a variety of trust indicia. For example, trust indicia may be configured as one or more identifiers provided by an extensibility module to establish identity. Identifiers may be used to establish confidence in the identity of the extensibility module. Trust indicia may also be reputation information gathered about the extensibility module. For instance, a community of users having experience with the extensibility module may recommend whether or not a particular extensibility module should be trusted. Reputation for an extensibility module from a variety of sources may be available from a reputation service.

Different trust indicia may be combined to establish trustworthiness of an extensibility module. Thus, trustworthiness may be determined using either identity or reputation, or using both identity and reputation combined. Reputation is typically the evidence of identity or known good behavior of the associated extensibility module. Additional trust indicia associated with an extensibility module are also contemplated, for example, source of the extensibility module, domain names or IP address where downloaded, time, date and so forth. Numerous types of trust indicia may be used, alone or in combination, to establish identity and reputation, thereby establishing trustworthiness.

Policies based upon trustworthiness may be applied to manage access to APIs. For example, a trust rating may be associated with an extensibility module based upon trust indicia. A policy may then allow access to APIs if an extensibility module based on the trust rating, e.g., the extensibility module has a trusted (e.g., "high") rating. On the other hand, access to APIs may be denied if there is a low trust rating. Further, polices may be set for all APIs of an application module or for subsets of the APIs. Thus, an extensibility module with an established trustworthiness (e.g., trust rating) may be permitted to access one subset of APIs and may be denied access to another subset of APIs. Policies may be set by default by the application module. Policies may also be defined by a user of the application module (which may include the overriding of default policies) via a user interface.

In the following discussion, an exemplary environment is first described which is operable to provide secure extensibility access techniques. Exemplary procedures are then described which are operable in the exemplary environment as well as in other environments.

Exemplary Environment

FIG. 1 is an illustration of an environment 100 operable to provide secure extensibility access to APIs of an application module. The environment 100 is illustrated as including a computing device 102 that is communicatively coupled to a network 104. The computing device 102 may be configured in a variety of ways. For example, computing device 102 may be configured as a computer that is capable of communicating over the network 104, such as a desktop computer, a mobile station, a game console, an entertainment appliance, a set-top box communicatively coupled to a display device, a wireless phone, and so forth. Computing device 102 may range from full resource devices with substantial memory and processor resources (e.g., personal computers, television recorders equipped with hard disk) to low-resource devices with limited memory and/or processing resources (e.g., traditional set-top boxes). In the following discussion, the computing device 102 may also relate to a person and/or entity that operates the computing device 102. In other words, computing device 102 may describe a logical device that includes a user and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Although a single network 104 is shown, the network 104 may be configured to include multiple networks. For instance, a plurality of computing devices 102 may be communicatively coupled via a peer-to-peer network to communicate, one to another. Each of the computing devices 102 may also be communicatively coupled to other computing devices over the Internet. Further, although a single computing device 102 is shown, it should be apparent that a number of computing devices such as computing device 102 may be connected to network 104. Accordingly, the computing device 102 may be representative of a plurality of computing devices that are configured to interact and communicate, one to another, via network 104, such as by email, instant messages, and so forth.

Computing device 102 is illustrated as including an application module 106. Application module 106 may provide a variety of functionality. For example, one or application module 106 may be configured to send and receive email. Email employs standards and conventions for addressing and routing such that the email may be delivered across the network 104 utilizing a plurality of devices, such as routers, other computing devices (e.g., email servers), and so on. In another example, application module 106 may be configured to provide one or more business productivity functions such as word processing, database, spreadsheet, and presentation functionality. In a further example, application module 106 may be configured to provide one or more software development functions such as development interfaces, tools, management, and compilation. Further, application module 106 may be configured to provide other computing functions such as web services, graphic design, web browsing, and media management, editing, viewing, and/or playback.

In yet another example, the application module 106 may be configured to send and receive instant messages. Instant messaging provides a mechanism such that a plurality of computing devices 102, when participating in an instant messaging session, may send text messages to each other. A plurality of computing devices 102 may be configured to communicate one to another via network 104. The instant messages are typically communicated in real time, although delayed delivery may also be utilized, such as by logging the text messages when one of the computing devices 102 is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

A computing device 102 typically will have numerous applications modules 106 which each may be configured in a variety of ways. It is contemplated that the techniques described herein may be employed with a variety of application modules 106 of a computing device 102 which may be configured to provide different respective functionality. For example, computing device 102 may have a business productivity application module and an instant messaging application module each configured to provide secure extensibility access to respective APIs using the techniques described.

Application module 106 is illustrated as including a plurality of application programming interfaces (APIs) 108(k) where "k" can be any integer from one to "K". APIs 108(k) within application module 106 may be used to extend functionality of application module 106. APIs 108(k) may be a set of routines, protocols, and tools configured to be used by a developer to create an extension (e.g., to add functionality) for application module 106. Thus, APIs 108(k) simplify third-party development by providing development building blocks and a mechanism for access to the developer. As will be described in greater detail in reference to FIG. 2, APIs 108(k) may be arranged into groups or subsets.

Application module 106 is depicted as having an API access module 110. API access module 110 is representative of functionality which may be utilized to control access to the APIs 108(k). For example, an extensibility module 112 which may be configured to access the application module 106. More specifically, extensibility module 112 may attempt to access APIs 108(k) or a subset of the APIs 108(k) of application module 106 to provide added or different functionality to application module 106. In an implementation, API access module 110 controls whether access to APIs 108(k) is given to extensibility module 112.

As depicted in FIG. 1 extensibility module 112 may be located on computing device 102. The computing device 102 may obtain the extensibility module in a variety of ways. Extensibility module 112, for instance, may be downloaded to computing device 102 from the internet, via network 104, a peer-to peer network and so forth. Further, extensibility module may be copied to computing device 102 via computer-readable media such as flash memory, CD ROMs, DVD ROMS, floppy discs and so forth. API access module 110 may operate to establish trustworthiness when extensibility module 112 seeks access to APIs 108(k).

For example, a third party developer may develop the extensibility module 112, which then seeks access to APIs 108(k) within application module 106. API access module 110 is executed to establish whether the extensibility module 112 satisfies a measure of trustworthiness before permitting access. Thus, if extensibility module satisfies the measure of trustworthiness, API access module API 110 may permit access to APIs 108(k). Extensibility module 112 may then operate to extend functionality of application module 112. Alternatively, API access module 110 may establish that extensibility module 112 fails a measure of trustworthiness and access to APIs 108(k) may accordingly be denied.

Although the extensibility module 112 is depicted on the computing device 102, in another instance the extensibility module 112 may remain at a remote location (e.g. upon a remote computer or upon media). In this instance, API access module 110 may be configured to determine the trustworthiness of extensibility module 112 before extensibility module 112 is downloaded or copied to computing device 102. Further, a different level of trustworthiness may be required to download an extensibility module 112 than is required to access one or more APIs 108(k). Thus, and extensibility module 112 may be downloaded based upon one level of trust, but be required to have a higher level of trust to access one or more APIs 108(k). Further discussion of establishing different levels of trustworthiness to access different API's 108(k) or subsets of API may be found in relation to FIG. 2.

API access module 110 may challenge an extensibility module 112 to establish trustworthiness using a variety of trust indicia. Trust indicia may include the identity of the extensibility module 112. Accordingly, API access module 110 may be configured to establish confidence in identity of an extensibility application 112. As depicted in FIG. 1 extensibility module 112 may include one or more identifiers 114(m), where "m" can be any integer from one to "M". Identifiers 114(m) may be configured in a variety of way. For example, identifiers 114(m) may be third party certificates; self signed certificates, public keys, a hash, a process id, an executable name and so forth. API access module 110 may reference one or more of identifiers 114(m) provided by extensibility module 112, as proof of identity. Based upon the number, quality and/or type of identifiers 114(m) provided, API access module 110 determines confidence in identity of extensibility module 112. Confidence in identity may be used alone or in combination with other trust indicia, including reputation discussed below, to establish trustworthiness.

In the case of an identifier 114(m) configured as a certificate, a certificate authority 116 connected to network 104 may be utilized to manage, validate, and distribute certificates. As depicted in FIG. 1 a certificate authority 116 includes certificate manger module 118 and has storage 120 to store a plurality of certifications 122(q) where "q" may be any integer from one to "Q". Storage 120, by way of example, may be a database to store certifications 122(q) for a plurality of modules including extensibility module 112.

In an implementation, a certification 122(q) corresponds to an identifier 114(m) provided by extensibility module 112 for proof of identity when challenged by API access module 110. API module 110 references the certification 122(q) for validation of the identifier 114(m) and accordingly to establish confidence in identity of the extensibility module 112. API access module 110 communicates with certificate authority 116 through network 104 to examine the certification 122(q). API access module 110 utilizes the certification 122(q) for validation of the identifier 114(m). Further, API access module 110 utilizes the results of validation to establish confidence in identity extensibility module 112.

While a single certificate authority 116 is depicted, it is contemplated that API access module 110 may be configured to communicate with a number of certificate authorities 116 as necessary to access certifications 122(q) corresponding with different extensibility modules such as extensibility module 112. Further discussion of identifiers 114(m) that may be referenced and employed by the application access module 110 to establish trustworthiness may be found in relation to FIG. 2.

Trust indicia may also include the reputation of the extensibility module 112. For example, the environment 100 of FIG. 1 is depicted as including a reputation service 124 that has a plurality of reputations 126(n) stored in storage 128, where "n" can be any integer from one to "N". The reputation service 124 may employ a reputation manager module 130 to aggregate reputations data from a variety of sources (and for a variety of modules) into reputations 126(n) that correspond to the modules. In one implementation, the reputation service 124 is configured to aggregate reputation data and to provide reputations 126(n) in "real-time" or near "real time". In this manner, the most up-to-date reputation data is provided for an associated module. If trust for a module becomes compromised, a change in the associated reputation 126(n) of the module may be distributed to clients in a timely fashion.

In an instance, API access module 110 uses one or more reputations 126(n) as trust indicia to establish trustworthiness of the corresponding extensibility module 112. While a single reputation service 124 is depicted, it is contemplated that API access module 110 may be configured to communicate with a number of reputation services 124 to access reputations 126(n) for extensibility modules such as extensibility module 112. Thus, a plurality of reputations 126(n) corresponding to an extensibility module 112 may be accessed from one or more reputation service 124.

Reputation data used to establish reputations 126(n) may be provided by a variety of sources. The reputation service 124, therefore, may act as a collector, aggregator and propagator of reputations 126(n) from the variety of sources, including other reputation services. Additionally, the reputation service 124 may utilize information to generate reputations 126(n) such as data from third parties and other independent data sources for use in generating the reputations. Reputation service 124 may also collect information from a community of users who may make recommendations regarding the extensibility module 112. Thus, a variety of users of a particular extensibility module 112 may drive reputation 126(n) of the module by providing feedback directly to a reputation service 124 or by providing information to another source collected by a reputation service 124 from the source. One or more reputations 126(n) may then be used by API access module 110 in establishing trustworthiness.

In an implementation, one or more of the trust indicia may be used to determine trustworthiness of an extensibility module 112 before permitting access to APIs 108(k). Thus, identity or reputation may be used alone to establish trustworthiness. In addition, different trust indicia, such as identity and reputation, may be used in conjunction to establish trustworthiness. Thus trustworthiness may be established in a variety of ways and varying levels of trust may be utilized to provide differing levels of access to APIs 108(k) (e.g. access to all, some, or none of the APIs).

In other words, API access module 110 may enforce a hierarchy of trustworthiness in which one or more ways of establishing trust are more likely to represent trustworthiness than one or more other ways of establishing trust. For example, if an identifier 114(m) provided by an extensibility module 112 is a third-party certificate from a highly-trusted third-party certifier, then a "trusted" rating (e.g., "high") of trustworthiness may be associated with the extensibility module 112. Sufficient reputation alone from a reputation service may also establish trustworthiness. Lower trustworthiness (i.e., not trusted) may be associated with an extensibility module 112 when a less trusted identifier 114(m) (e.g. a hash)

is used for proof of identity and no other trust indicia are available. If, however, a lesser identifier 114(*m*) (e.g. a hash) is used for proof of identity and is supplemented with a good reputation from a reputation service, then an intermediate trustworthiness may be associated with the extensibility module 112. Naturally a variety of combinations of trust indicia may result in a variety of corresponding trustworthiness.

The hierarchies of trustworthiness may be employed and maintained in a variety of ways. For example, the hierarchies may be policies built into API access module 110, e.g., by hand crafted rules, machine learning, and so on provided by the user, deployed and updated dynamically from a web update service, and so on. Further discussion of trustworthiness hierarchies and policies may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of secure extensibility access described below are platform-independent, meaning that the strategies may be implemented on a variety of commercial computing platforms having a variety of processors.

Figure 2:
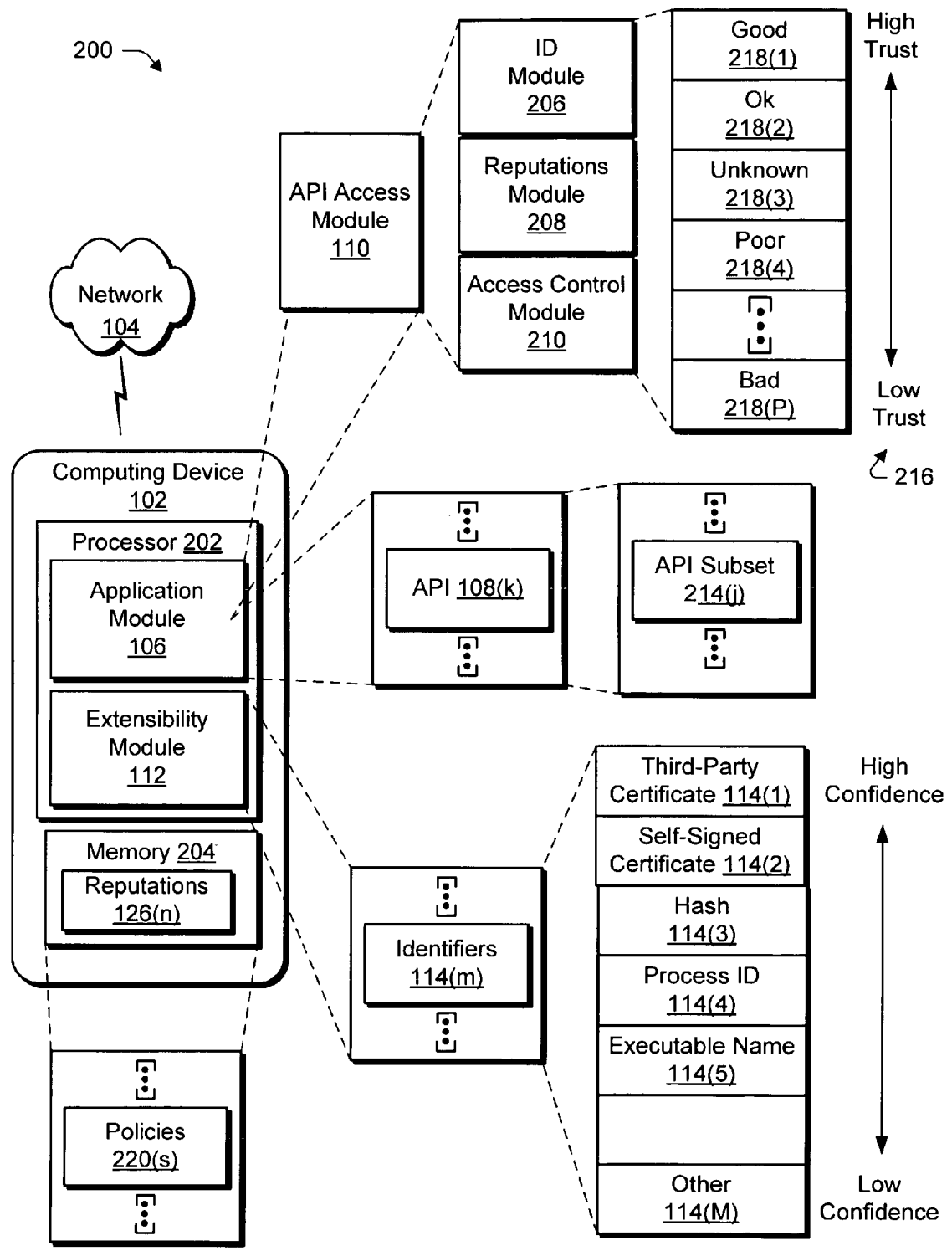
FIG. 2 is an illustration of a system in an exemplary implementation showing aspects of the computing device and modules of FIG. 1 in greater detail.

FIG. 2 is an illustration of a system 200 in an exemplary implementation showing aspects of the computing device 102 of FIG. 1 in greater detail. Computing device 102 of FIG. 2 is illustrated as including a processor 202 and memory 204. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204 is shown for the computing device 102 a wide variety of types and combinations of memory may be employed, such as random access memory (RAM), hard disk memory, removable medium memory, and so forth.

The computing device 102 is illustrated as executing an application module 106 on the processor 202, which is storable in memory 204. The application module 106 when executed may be utilized to perform a variety of functions as discussed in reference to FIG. 1. Further, computing device 102 is illustrated as executing an extensibility module 112 on the processor 202. As previously indicated, extensibility module may also remain at a remote location (e.g. upon a remote computer or upon media).

Application module 106 is depicted as having an API access module 110. API access module 110 is representative of functionality which may be utilized to establish trustworthiness of extensibility module 112 using trust indicia and to control access to APIs 108(*k*) within application module 106. For example, API access module 110 may challenge extensibility module 112 before permitting access to APIs.

API access module 110 may further include additional modules to perform a subset of the functionality of API module 110. By way of example, FIG. 2 depicts API access module 110 having identification module 206, reputations module 208, and access control module 210. Identification module 206 is representative of functionality which may be utilized to determine confidence in identity of extensibility module 112. Reputations module 208 is representative of functionality which may be utilized to obtain reputation data regarding extensibility module 112. Access control module 210 is representative of functionality which may be utilized to establish trustworthiness of extensibility module 112 and control access to APIs based upon trustworthiness. Naturally, in other implementations the modules may be further separated into stand-alone modules, combined, and so on without departing from the spirit and scope thereof.

The extensibility module 112 may provide a plurality of identifiers 114(*m*), where "m" can be any integer from one to "M", which may be utilized to establish trustworthiness of extensibility module 112. As indicated identity may be one type of trust indicia used in establishing trustworthiness. Extensibility module 112, for example, may provide one or more identifier 114(*m*) as proof of identity when challenged by application access module 110. In an implementation, application access module 110 may use one or more identifiers 114(*m*) to determine a confidence in identity 212 of extensibility module 112. Confidence in identity 212 may depend upon the quality, number and/or type of identifiers 114(*m*) provided by the extensibility module 112. Thus, as depicted in FIG. 2, confidence in identity 212 may be defined on a relative scale based upon what identifiers 114(*m*) are available from extensibility module 112.

In an instance, confidence in identity 212 may be a rating on a scale running from high confidence (e.g., trusted) to low confidence (e.g., not trusted). Confidence in identity 212 may be related to ease in spoofing or falsifying the provided identifiers. If confidence in identity 212 is sufficiently high, then confidence in identity 212 may establish trustworthiness of extensibility module 112. In other words, application access module 110 may permit access to one or more APIs 108(*k*) using only confidence in identity 212. In this case, additional or different trust indicia are not necessary to establish trustworthiness.

If confidence in identity 212 is insufficient, then additional trust indicia may be sought to supplement identity and establish trustworthiness. Thus, application access module 110 may be configured to use confidence in identity 212 in combination with other trust indicia to determine whether APIs 108(*k*) may be accessed by extensibility module 112. A variety of identifiers 114(*m*) and combinations thereof may be employed by API access module 110 examples of which are described as follows.

Third Party Certificates 114(1)

Third-party certificates 114(1) may involve the signing of a portion of extensibility module 112 with a certificate that can be traced to a certificate authority (e.g. certificate authority 116 depicted in FIG. 1). API access module 110 may process the certificate which typically includes the identity of the certificate authority. For example, API access module 110 may validate the certificate to establish the trustworthiness of the extensibility module 112. If necessary, validation may involve communication between computing device 102 and certificate authority 116 via network 104. A certificate may also be encrypted using a public/private key pair. Thus, API access module may use a public key provided with a certificate 114(1) to decrypt the certificate.

The level of trustworthiness established by this technique may also be based on the reputation of the third party certifier and a type of certificate (e.g. some certifiers offer several levels of increasingly secure certification). In other words, the confidence in identity, and therefore trustworthiness, may be dependent upon who issued the certificate and what type of certification is used. For example, trustworthiness may be immediately established for an extensibility module 112 that is signed by a particular third-party certifier, while another extensibility module 112 signed by another third-party certifier may require additional trust indicia before trustworthiness is established.

Self-Signed Certificate 114(2)

A certificate may also configured as a self-signed certificate 114(2). As with a third-party certificate 114(1), self-singed certificates 112(2) involve signing a portion of an extensibility module 112 with a certificate, except in this case the developer of the extensibility module 112 creates the certificate rather than a third party. Thus, self-signing may be a more convenient and less costly manner of singing for the developer. Trustworthiness that results from a self-signed certificate 114(2), therefore, depends again upon who issued the certificate. A known and reputable party, for example, may establish trustworthiness using only self-signed certificates. However, other self-signers may require additional trust indicia before trustworthiness is established. For instance, a self-signed certificate 114(2) of a relatively unknown party may be supplemented with reputation data, such as a reputation 126(n) associated with the extensibility module 112. Policies within API access module 110 may determine which combinations of trust indicia are required for different certifiers.

A public/private key pair may also be used in conjunction with third party certificates 114(1) or self-signed certificates 114(2). In an implementation, this involves creation of a public/private key pair, signing the certificate with the private key, and distributing the public key with the certificate or via other distribution methods. API access module 110 may use the public key associated with a certificate provided by an extensibility module 112 to decrypt the certificate, validate the certificate, establish confidence in identity, and so forth.

Hash 114(3)

A hash 114(4) of the contents of an extensibility module 112 may also be used to establish identity and trustworthiness. The hash utilized may be the product of any well-known hash function, such as SHA-1 or MD-5, or may be the product of any effectively unique content-specific hash function. Hash functions may take the contents of extensibility module 112 and run it through a standardized mathematical function to create a digest, or digital fingerprint, which may be a 128-bit, 160-bit, or any other sized portion of data. Small changes in the message create radically different digests, and the digest provides no useful information about the content of the file, other than its identity. Two files having the same content (having no other data appended) will produce the same digest. The likelihood of two different files having the same digest is considered remote, so as to create an effective identifier. A hash 114(4) may be provided with extensibility module 112. Alternatively, API access module 110 may be configured to create a hash 114(4) of an extensibility module 112.

Further, hash functions may be computed for modules known to be trustworthy and for modules for known rouge or malicious modules. A hash list may then be created that identifies which of the variety of hashes are trustworthy and which are not. Such a list may then be maintained within API access module 110. A hash list might also be updateable or accessible via network 104 from a web service. For example, reputation service 124 may provide hash lists in addition to or in lieu of reputations 126(n). Thus a computed or provided hash 114(4) of extensibility module 112 may be compared to the hash list to verify identity and/or establish trustworthiness.

Process ID 114(4) Executable Name 114(5) and Other Identifiers 114(m)

Extensibility module 112 on computer 102 may provide a variety of other associated identifiers. For example, a process ID 114(4) or executable name 114(5) may be associated with extensibility module 112 and may be provided to API access module 110 as proof of identity. Other identifiers 114(m) are also contemplated, for example, a file name, a file size, a creation date, a download location (e.g. domain name, or IP address) and so forth. Many types of identifiers 114(m) may be low-level identifiers which are easily spoofed or falsified and thus would establish a low confidence in identity 212. Such low-level identifiers may be used in conjunction with other more reliable identifiers and/or with other types of trust indicia (e.g. reputation). For example, combinations of identifiers such as self-signed certificate 114(2) and process ID 114(5) may establish a high confidence in identity 212 than each alone. Further, one or more identifiers 114(m) may be used by API access module 110 to access a reputation 126(n) from a reputation service such as reputation service 124 depicted in FIG. 1.

Another type of trust indicia is reputations 126(n). As previously indicated, reputations 126(n) associated with an extensibility module 112 may be used in conjunction with or in lieu of confidence in identity 212 to establish trustworthiness of extensibility module 112. FIG. 2 depicts reputations 126(n) in memory 204 of computing device 102. API access module 110, when executed on the processor 202, may retrieve one or more reputations 126(n) associated with the extensibility module 112 when attempting to access APIs 108(k) of the application module. For example, reputations 126(n) may be accessed from a reputation service 124 and stored in memory 204 of computing device 102.

In an implementation, API access module 110 uses one or more identifiers 114(m) associated with extensibility module 112 to query a reputation service 124 via network 104. API access module 110 may request a reputation 126(n) associated with extensibility module 112 using one or more identifiers 114(m) provided by the extensibility module 112, a hash of the extensibility module 112, and so on. Reputation service 124, and more particularly the reputations manager module 130, is configured to receive requests for reputations and to retrieve one or more reputations 126(n) corresponding to identifiers 114(m) provided by the request. The reputations 126(n) may then be communicated to the computing device 102 via the network 104. As depicted in FIG. 2, the communicated reputations 126(n) may be stored in memory 204. API access module 110 may then use reputations 126(n) in establishing trustworthiness of an associated extensibility module 112.

It is contemplated that API access module 110 may be configured to query a plurality of reputation services 124 and to retrieve one or more reputation 126(n) from each reputation service 124 if available. For example, two reputation services may each provide a different reputation associated with an extensibility module 112. API access module 110 may be further configured to aggregate reputations 126(n) from the plurality of sources (e.g. multiple reputation services). In one instance a user of application module 106 may select which of a plurality of reputation services should be used to obtain reputations. In this manner a user may select one or more reputation services that the user prefers. Naturally, default settings may select a reputation service in the absence of user action.

Reputations 126(n) may indicate a measure of relative trustworthiness of an extensibility module and may originate from a variety of sources. For example, third-party raters of reputation services, a community of users, individuals and extensibility developers may provide reputation service 124 information regarding extensibility modules 112, and so on. Reputation service may aggregate information from this variety of sources into a reputation 126(n). The proprietors of a reputation service 124 may also develop reputations 126 on their own as a portion of their service.

In an implementation, reputation 126(n) may indicate that the subject extensibility module 112 is either recommended or not recommended, i.e., trusted or not trusted. In another instance, reputations 126(n) may aggregate representations of information gathered from many users regarding the subject extensibility module 112. For example, a reputation 126(n) may indicate a number of users reporting, a percentage recommending, and a percentage not recommending. Reputation 126(n) may also be a rating such as good, ok, bad, unknown and so forth. A variety of other scales of relative reputation are contemplated such as a letter grade, a percent recommended, a number, and so forth. API access module 110 may be configured to process one or more reputations 126(n) in a variety of forms to establish the relative trustworthiness of extensibility module 112.

The techniques and procedures describe herein may be used to control access to all or some of the APIs 108(k) of an application module 106. FIG. 2 further depicts API 108(k) as plurality of API subsets 214(j) where "j" may be any integer from one to "J". APIs may be grouped in a variety of ways to establish one or more API subsets 214(j). For example, one API subset 214(1) may by related to user interface features of an application module 106 such as menus, fonts and so forth. Another subset 214(2) may be related to communications functionality of application module 106. Thus, different APIs subsets 214(j) may be used to allow extensibility to different components of application module 106.

Further access to different subsets 214(j) of APIs may be restricted or controlled based upon different levels of trustworthiness. A more sensitive or critical API subset 214(j), for instance, may require a relatively high degree of trustworthiness to be established. For example, only an extensibility module 112 providing a third-party certification 114(1) will be permitted access to a critical API subset 214(j). Other less sensitive API subsets 214(j) may be accessible if a lower degree of trustworthiness is established, for example using a hash 114(3) supplemented with a favorable reputation 126(n).

At some low level of trustworthiness access to all APIs 108(k) and API subsets 214(j) may be denied. On the other side, at some high level of trustworthiness access to all APIs 108(k) and API subsets 214(j) may be permitted. If insufficient information is available to establish trustworthiness an extensibility module 112 may be denied access and quarantined. API access module 110 may then attempt to establish trustworthiness at a later time.

It is also noted, that a threshold level of trustworthiness may be required before an application module is downloaded, copied and/or executed. In other words, one trust level may be required to enable downloading or copying of an extensibility module 112 to a computing device 102. Then, when extensibility module 112 is executed and attempts access to various API's 108(k) or API subsets 214(j), an additional determination of trustworthiness may be required before permitting access to each API 108(k) or subset 214(j). In this manner, threshold level trustworthiness may be required before allowing an extensibility module any access to computing device 102 or APIs 108(k). If the threshold level is satisfied, some of APIs 108(k) may be accessible while more sensitive APIs 108(k) may require additional proof of trustworthiness before access is permitted.

Thus, a variety of combinations of trust indicia allows for different manners of establishing trustworthiness and may result in different degrees of access to APIs. A developer of an extensibility application 112 is not limited to a single manner of establishing trust. Allowing only third-party certifications 114(1), for example, may be cost prohibitive for an individual developer or hobbyist. Using the secured extensibility access techniques described, confidence in identity 212 may be established user a variety of identifiers 114(m). Further reputations 126(n) may be used to supplement poor proof of identity. Different levels of access may be may correspond to different levels of trust.

API access module may define varying degrees of trustworthiness depending upon what of identifiers 114(m) are used (e.g what confidence of identity 212 exists) and what reputations 126(n) are available (e.g. good, bad and so forth). In other words, API access module 110 may employ a scalable treatment depending on the trustworthiness (e.g., the strength of identity and reputation) associated with the extensibility application 112.

In an implementation, trust indicia (whether alone or in differing combinations) may be used by API access module 110 to establish relative trustworthiness. The trustworthiness may then be expressed as a "trust rating" having several different levels (i.e., hierarchies) of trust. FIG. 2 depicts a trustworthiness scale 216 defining relative trustworthiness. Trustworthiness scale 216 may be implemented in a variety of ways. As depicted in FIG. 2 trustworthiness scale 216 has a plurality of trust ratings 218(1), . . . , 218(P). Trust ratings may be, for example, "Good" 218(1), "Ok" 218(2), "Unknown" 218(3), "Poor" 218 (4) or "Bad" 218(P). Numerous other manners of expressing relative trustworthiness may be employed, such as a letter, a number, a percent trusted and so forth. Thus, API access module 110 may be configured to employ trust indicia to establish trustworthiness in the form of a relative trust rating 218.

These rating may then be used to permit or deny access to APIs 108(k) or different API subsets 214(j) based on which of the different trust ratings 218(1)-218(P) are satisfied by the application, e.g., the trustworthiness of the extensibility module 112. For example, if the combined trust indicia for a particular extensibility module 112 results in a "high-level" trust rating (e.g., Good 218(1)) then the extensibility module 112 may be permitted to access APIs 108(k) of the application module 106. However, if the extensibility module meets "lower-level" trust rating (e.g. Ok 218(2)), the extensibility module 112 may be denied access to all APIs 108(k) of an application module 106, or be given differential access to subsets of APIs 214(j), e.g., permitted to access certain APIs 108(k) and denied access to other APIs 108(k). Further, the extensibility module 112 may be prevented from executing entirely or quarantined if trustworthiness (e.g. trust rating) is below a threshold level (e.g. Bad 218(p) or may not be determined (e.g., Unknown 218(3)).

Thus secure extensibility access techniques described create access availability to a wide range of extensibility developers that may have varying abilities and resources available to establish trust. Depending upon what level of access to APIs 108(k) is required by a particular developer, different approaches to establishing trust may be employed. The level of proof required to gain access may be matched to the level of access sought. If low level proof is provided, access may be granted to a limited subset of APIs 214(j). However, if greater proof is provided, then more access may correspondingly be obtained (e.g. to other subsets 214(j) or to all APIs 108(k)).

Further, one or more configurable policies 220(s), where "s" may be any integer from one to "S", may be used to manage access to APIs 108(k) based upon trustworthiness. Policies 220(s) may define what access to APIs 108(k) is provided for each level of trustworthiness on a trustworthiness scale 216. For example, API access control module 110 may examine one or more policies 220(s) that define which APIs 108(k) or subsets of APIs 214(j) may be accessed for example by an extensibility module 112 having high trustworthiness (e.g. a trust rating of Good 218(1).) The same policy 220(s) or another policy may similarly define what access is permitted at other relative trustworthiness levels (e.g. OK 218(2), Unknown 218(3), and so forth). Thus, a single policy or set of policies 220(s) may establish the rules that govern what level of trust is required to access various APIs 108(k) of an application module 106. API access module 110 applies these rules to manage access given to an extensibility module 112 having an established trustworthiness.

Policies 220(s) may be maintained within API access module 110, application module 106, computing device 102 and so forth. For instance, policies 220(s) are depicted in FIG. 2 as stored within memory 204 of computing device 102. It is noted that policies 220(s) might also be accessible from a remote location via network 104, a peer-to peer network, or otherwise remotely accessible. For example, a community of users may share policies 220(s) via network 104.

In an implementation, the API access module 110 may also set default policies 220(s) which may be modified by a user of application module 106. API access module 110, for example, may expose a user interface that allows a user to set a variety of access policies including overriding default policies 220(s). Access policies 220(s) may be set for APIs or subsets of APIs within an application module 106. Further policies 220(s) may also define what type trust indicia is required to establish a particular trust rating 218. Thus, a policy 220(s) may specify that a third-party certificate 114(1) is to be provided as proof of identity to access a certain subset of APIs 214(j). A user may then modify the policy 220(s) to allow a self signed-certificate 114(2) to be used to access the same set of APIs 214(j).

In an implementation, a user may also be permitted to configure other aspects of API access module 110. For example, a policy 220(s) may define which identifiers 114(m) or combinations of identifiers may result in sufficient confidence in identity 212 to establish trustworthiness without additional trust indicia. In other words, the policy defines what level of confidence in identity 212 necessitates additional trust indicia. Additionally, policies 220(s) may be used to set correlations between confidence in identity 212 and trust ratings 218. Similarly, policies 220(s) may also be used to set correlations between reputations 126(n) from a reputation service 124 and trust ratings 218. Thus, configurable policies 220(s) within application module 106 may be used in a variety of ways to manage access to APIs 108(k) based upon trustworthiness.

Exemplary Procedures

The following discussion describes API management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

It should also be noted that the following exemplary procedures may be implemented in a wide variety of other environments without departing from the spirit and scope thereof.

Figure 3:
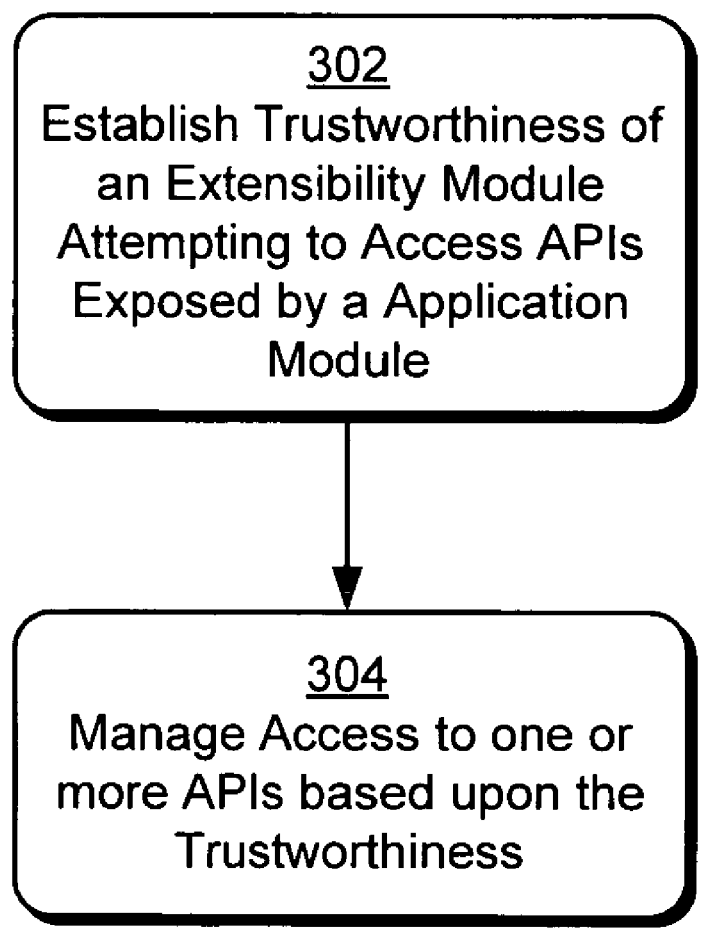
FIG. 3 is a flow chart depicting a procedure in an exemplary implementation in which the access to APIs given to an extensibility module is managed based upon trustworthiness.

FIG. 3 depicts a procedure 300 in an exemplary implementation in which the access to APIs given to an extensibility module is managed based upon trustworthiness. The trustworthiness of an extensibility module attempting to access an application module is established (block 302). For example an extensibility module 112 may be executed on computing device 102 of FIG. 1. Extensibility module 112 may attempt to access APIs 108(k) exposed by an application module 106 to provide added or different functionality. For example, extensibility module may seek to modify the menu items within the user interface of the application module 106.

Access to API's is managed based upon trustworthiness (block 304). In the previous example trustworthiness of extensibility module 112 may be established as "low", i.e., untrustworthy. Thus, access to APIs 108(k) may be denied. Accordingly, extensibility module 112 is not executable to provide added functionality (change menu items) to the application module 106. In another instance, trustworthiness of extensibility module 112 is established as "unknown". In this instance, the extensibility module 112 is denied access and quarantined. An attempt to establish the trustworthiness of the quarantined extensibility module 112 may then be made at a later date when more information is available. Further, if trustworthiness meets a threshold level (e.g., "medium" trustworthiness) corresponding to specific APIs 108(k) that the extensibility module 112 is seeking to access, then API access module 110 may permit access to those specific APIs 108(k).

Figure 4:
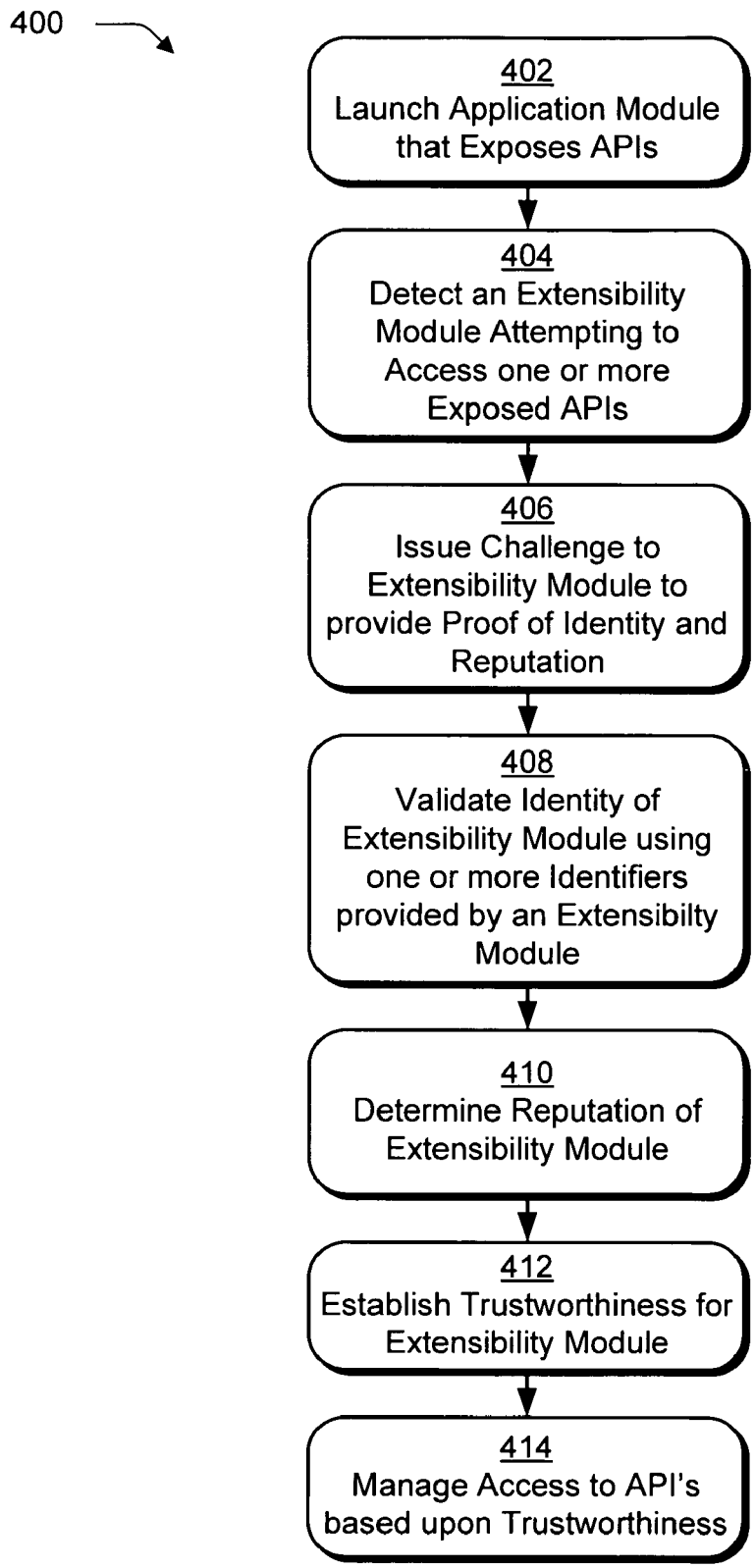
FIG. 4 is a flow chart depicting a procedure to manage access to APIs in an exemplary implementation in which validating identity and determining reputation of an extensibility module are included.

FIG. 4 depicts a procedure 400 in an exemplary implementation in which an application module manages access to exposed APIs of the application module. The application module is launched that exposes APIs (block 402). For example application module 106 of FIG. 2 may be executed on processor 202 of computing device 102, thereby exposing the APIs 108(k). An extensibility module is detected that is attempting to access APIs of an application module (block 404). For instance, application module 106 detects extensibility module 112 when executed on processor 202 and attempting to access the APIs 108(k).

A challenge is issued to the extensibility module to provide proof of identity and reputation (block 406). Continuing with the previous example, application module 106 in FIG. 2 may challenge extensibility module 112 before allowing access to the APIs 108(k).

Identity of an extensibility module is validated using one ore more identifiers provided by the extensibility module (block 408). For example, the extensibility module 112 may provide one or more identifiers for proof of identity such as, a third-party certificate, a self-signed certificate, a hash, a process id, an executable name attachment, and so on. The application module 106 validates the identity of the message using one or more of the identifiers. Validating may result in a confidence in identity 212 of extensibility module 112 as described previously in relation to FIG. 2.

The reputation of an identified extensibility module is determined (block 410). Following the previous example, application module 106 queries one or more reputation services, such as reputation service 124 depicted in FIG. 1. The application module 106 may use one or more of identifiers 114(m) to request reputations 126(n). In response, the reputation service 124 (or reputation services) returns one or more reputations 126(n) that correspond to the extensibility module 112. Reputations 126(n), for instance, may include a number of users reporting on extensibility module 112 and a percentage of users recommending the extensibility module.

Thus, a reputation 126(n) may indicate one hundred users, with seventy-five percent recommending.

The trustworthiness of an extensibility module is established (block 412). For example, application module 106 may use identifiers 114(m), confidence in identity 212, and reputations 126(n) to establish trustworthiness for the extensibility module 112. Access to APIs is managed based upon trustworthiness (block 414). For example, if the extensibility module is trusted (e.g., has a high trustworthiness), the application module 106 may permit access to the APIs 108(k). If trustworthiness is relatively "lower", however, the application module 106 may deny access to some or all of APIs 108(k). Thus, application module 106 may manage access to APIs based upon trustworthiness.

Figure 5:
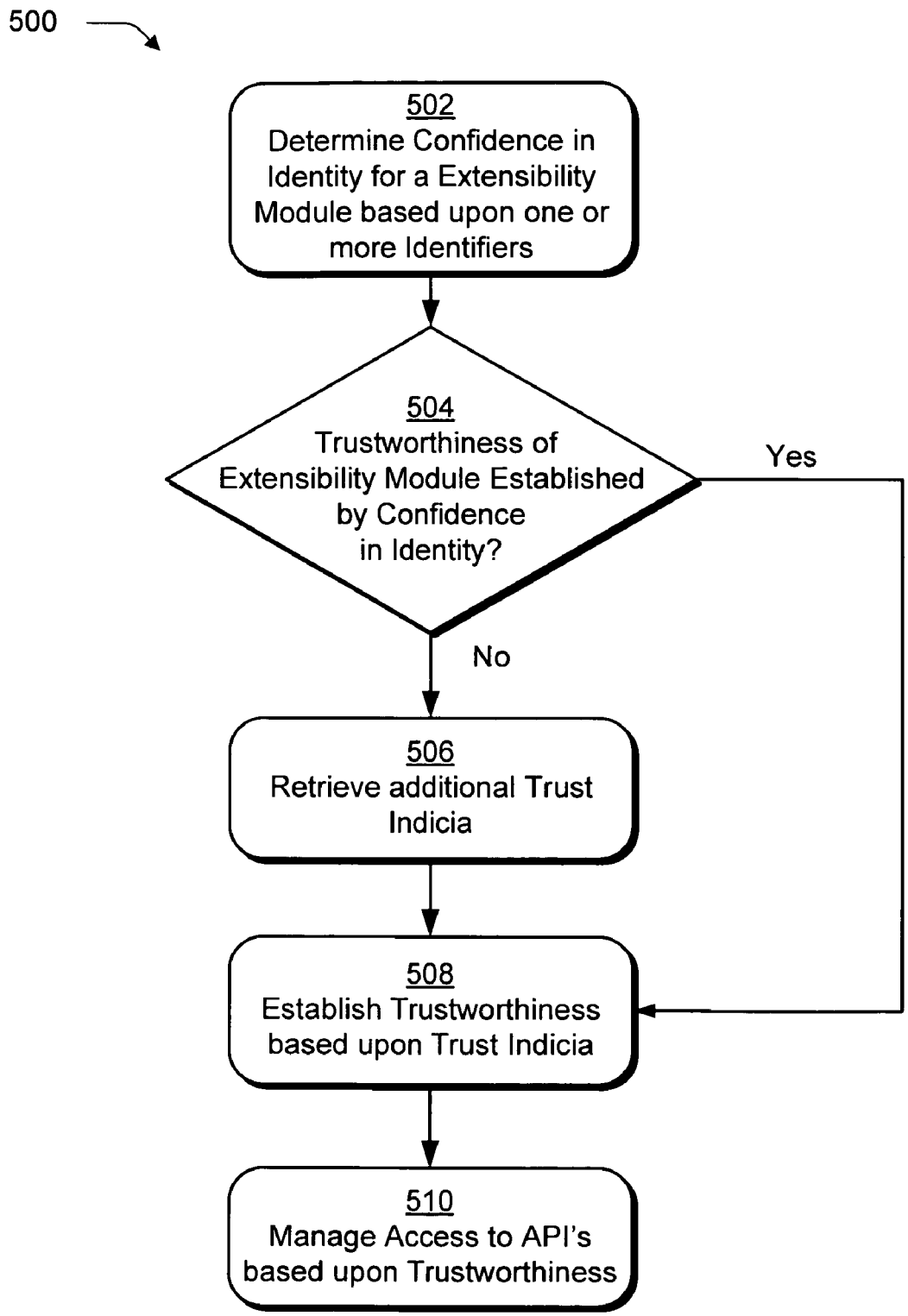
FIG. 5 is a flow chart depicting a procedure in an exemplary implementation in which trust indicia are used to establish trustworthiness.

FIG. 5 depicts a procedure 500 in an exemplary implementation in which trust indicia are used to establish trustworthiness. Confidence in identity for an extensibility module is determined based upon one or more identifiers (block 502). For example, an application module 106 as depicted in FIG. 2 may be an instant messaging application. Extensibility module 112 may seek access to APIs 108(k) of the instant messaging application to provide additional or different functionality, such as enhanced message logging features or message formatting features. API access module 110 included with instant messaging application may challenge access to APIs 108(k) and seek to establish confidence in identity 212 of extensibility module 112 as previously described in relation to FIG. 4. Extensibility module 112 may then provide one or more identifiers 114(m) as proof of identity. Identifiers 114(m) may be used by API access module 110 to determine confidence in identity 212. Confidence in identity 212, for example, may depend upon the number, type and quality of identifiers 114(m) provided by the extensibility module 112. For instance, extensibility module 112 may provide a self-signed certificate 114(2) as proof of identity. API access module 110 may validate the certificate and establish confidence in identity 212.

A determination is made if confidence in identity 212 is sufficient to establish trustworthiness of the extensibility module (decision block 504). Staying with the previous example, the self-signed certificate 114(2) may correspond to a "high" confidence in identity 212 based upon a default settings or a user defined policy of API access module 110. The policy may also define that additional trust indicia are not required to permit access to APIs 108(k). In this instance, trustworthiness may be established base upon trust indicia (block 508) without retrieving additional trust indicia (block 506). For example API access module 110 may establish trustworthiness based upon the self-signed certificate 114(2) alone.

In another instance, the self-signed certificate 114(2) may not be sufficient based upon a default settings or a user defined policy of API access module 110 to establish trustworthiness alone. In other words, API access module 110 through default settings or a policy may require that self-signed certificate 114(2) be supplemented with additional trust indicia. In this second instance, additional trust indicia may be sought (block 506). For example, API access module 110 may query a reputation service 124 depicted in FIG. 1 using one or more identifiers 114(m) to retrieve one or more reputations 126(n). As depicted in FIG. 2 reputations 126(n) from one or more reputation service 124 may be retrieved to memory 204 of computing device 102. Reputations 126(n) may indicate for example that the extensibility module 112 configured to add logging features to instant messaging application (application module 106) is recommended.

Trustworthiness is then established based upon trust indicia (block 508). In the second instance, trustworthiness may be established using all the trust indicia gathered. Thus, trustworthiness may be established using both confidence in identity 212 determined based upon a self-signed certificate 114(2), and reputations 126(n) gathered from a reputation service 124. Again, default settings or user policies may define what level of trustworthiness is assigned to extensibility module depending on the number, type, and quality of trust indicia. As depicted in FIG. 2, trustworthiness may be defined as a trust rating 218 upon a relative trust scale 216.

Based upon the trustworthiness, access to APIs of an application module is managed (block 510). In the previous examples trustworthiness of extensibility module 112 may be established as "high", and thus, access to APIs 108(k) may be permitted. Therefore, the extensibility module 112 may be executed to provide added functionality to the instant messaging application.

In another example, extensibility module 112 of FIG. 2 may seek access to APIs 108(k) of the instant messaging application (e.g., application module 106) to provide both enhanced message logging features and message formatting features. Further, APIs 108(k) may be organized in subsets 214(j) corresponding to different components of instant messaging application. Thus, one subset may correspond to message logging and another subset may correspond to message formatting. Naturally, a variety of other subsets may exist corresponding to a variety of aspects of the instant messaging application. In this example, trustworthiness established for the extensibility module 112 may be sufficient to access one subset and insufficient to access another subset. Thus, API access module 110 may manage access to APIs 108(k) by permitting access to one subset and denying access to another subset.

FIG. 6 depicts a procedure 600 in an exemplary implementation in which policies are utilized to manage the access to APIs given to an extensibility module. A policy is examined that defines permissible access to an application module based upon the trustworthiness of an extensibility module attempting to access the application module (block 602). For example, API access module 110, within application module 106 depicted as executed on computing device 102 of FIG. 1, examines a policy that defines access to APIs 108(k) of the application module based upon the trustworthiness of a module, such as extensibility module 112, which may attempt to access APIs 108(k).

Access to API's of an application module is managed based upon the examined policy (block 604). For example, the policy may indicate that an untrustworthy module will be denied access to all APIs 108(k). Thus, if trustworthiness of extensibility module 112 is untrustworthy, API access module 110 may manage access to deny access to APIs 108(k). The policy may also indicate that a trustworthy module will be allowed to all APIs 108(k). Accordingly, if the extensibility module is trustworthy, then API access module 110 will manage access to permit access to APIs 108(k). Naturally, a variety of combinations of trustworthiness and corresponding access may be described by one or more policy. Thus, the policies may be used to manage access to APIs 108(k) in a variety of ways.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. One or more computer-readable storage media storing computer-executable instructions that, when executed by a processor, cause the processor to perform acts, the acts comprising:

providing a plurality of application program interfaces (APIs) exposed by an application module, wherein each of the plurality of APIs has restricted access;

associating a trust rating of a plurality of trust ratings to each of the plurality of APIs;

receiving and storing an extensibility module;

detecting the extensibility module attempting to access one or more APIs of the application module;

establishing trustworthiness of the extensibility module, wherein the established trustworthiness is associated with at least one of the plurality of trust ratings;

determining a subset of the plurality of APIs the extensibility module will be allowed to access by comparing the trustworthiness of the extensibility module with the trust rating associated with each of the plurality of APIs; and permitting access to the subset of the APIs based upon the established trustworthiness, the access facilitating extensibility of the application module by the extensibility module.

2. The acts as recited in claim 1 wherein the establishing further comprises determining confidence of identity for the extensibility module using at least one of one or more identifiers provided by the extensibility module as proof of identity.

3. The acts as recited in claim 2 wherein the one or more identifiers provided by the extensibility module as proof of identity are selected from the group consisting of:

a third-party certificate;

a self-signed certificate;

a public key;

a hash of the extensibility module;

a process ID; and an executable name.

4. The acts as recited in claim 1, the acts further comprising restricting access to another API based on the established trustworthiness.

5. The acts as recited in claim 1, wherein the establishing is based at least in part on one or more reputations associated with the extensibility module.

6. The acts as recited in claim 5 wherein the one or more reputations are retrieved by querying at least one reputation service over a network.

7. The acts as recited in claim 5 wherein at least one said reputation associated with the extensibility module represents an aggregation of reputation information regarding the extensibility module compiled from one or more sources selected from the group consisting of:

the reputation service;

another reputation service;

a community of users;

a trusted provider;

user feedback; and a peer to peer network.

8. The acts as recited in claim 1 wherein establishing trustworthiness is based in part upon a plurality of reputations of the extensibility module wherein at least one reputation is provided by different respective reputation services.

9. One or more computer-readable storage media storing computer-executable instructions that, when executed by a processor, cause the processor to perform acts, the acts comprising:

receiving and storing an extensibility module;

detecting the extensibility module attempting to access one or more application programming interfaces (APIs) of an application module;

examining a policy that describes permissible access to the one or more APIs of the application module based on trustworthiness of the extensibility module that attempts the access, wherein the policy defines at least one of a plurality of trust ratings for each of a plurality of APIs of the application module, wherein the trustworthiness is based on at least one of the plurality of trust ratings determined to be associated with the extensibility module; and managing access of the extensibility module to APIs of the application module based on the examined policy, the access facilitating extensibility of the application module by the extensibility module.

10. The acts as recited in claim 9 wherein the managing further based on comparing trustworthiness of the extensibility module to a threshold trustworthiness associated with a subset of the APIs that is to be satisfied by the extensibility module before permitting access to the subset.

11. The acts as recited in claim 9 wherein the managing is further based on:

comparing trustworthiness of the extensibility module to a threshold trustworthiness associated with each of a plurality of subsets of the APIs; and controlling access to each said subset of the APIs based upon the respective comparison.

12. The acts as recited in claim 9 wherein, the policy includes a plurality of trustworthiness thresholds corresponding respectively to a plurality of subsets of the APIs.

13. The acts as recited in claim 12 wherein the trustworthiness thresholds associated with said each subset of the APIs are defined by a user of the application module.

14. One or more computer readable media comprising computer executable instructions that, when executed on a computer, direct the computer to perform acts comprising:

receiving and storing an extensibility module and determining trustworthiness of the extensibility module to access one or more of a plurality of application programming interfaces (APIs) exposed by an application module, wherein each of the plurality of APIs has restricted access, and wherein at least one of a plurality of trust ratings is associated with each of the plurality of APIs.

15. One or more computer readable media as recited in claim 14 wherein the trustworthiness is determined at least in part by evaluating trust indicia that includes one or more identifiers provided by the extensibility module for proof of identity.

16. One or more computer readable media as recited in claim 15, the acts further comprising assigning a trust rating to the extensibility module based on the determined trustworthiness.

17. One or more computer readable media as recited in claim 14 wherein the trustworthiness is determined at least in part by evaluating trust indicia that include one or more identifiers provided by the extensibility module and one or more reputations that correspond to the extensibility module.

18. One or more computer readable media as recited in claim 17 wherein trust rating is assigned without additional trust indicia if the one or more identifiers provided by the extensibility module as proof of identity include a valid third-party certificate.

* * * * *

UNITED STATES PATENT AND TRADEMARK OFFICE
CERTIFICATE OF CORRECTION

PATENT NO. : 7,730,539 B2  Page 1 of 1
APPLICATION NO. : 11/256671
DATED : June 1, 2010
INVENTOR(S) : Elissa E. S. Murphy et al.

It is certified that error appears in the above-identified patent and that said Letters Patent is hereby corrected as shown below:

In column 18, line 18, in Claim 10, after "managing" insert -- is --.

Signed and Sealed this
First Day of February, 2011

David J. Kappos
*Director of the United States Patent and Trademark Office*